US011700238B2

(12) United States Patent
Rawat et al.

(10) Patent No.: US 11,700,238 B2
(45) Date of Patent: *Jul. 11, 2023

(54) SYSTEMS AND METHODS FOR PROVIDING COMMUNICATIONS BETWEEN ON-PREMISES SERVERS AND REMOTE DEVICES

(71) Applicant: Open Text Corporation, Waterloo (CA)

(72) Inventors: Harish Rawat, San Jose, CA (US); Sachin Gopaldas Totale, Pleasanton, CA (US); Ahson M Ahmad, Dublin, CA (US)

(73) Assignee: Open Text Corporation, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/353,871

(22) Filed: Jun. 22, 2021

(65) Prior Publication Data

US 2021/0314294 A1 Oct. 7, 2021

Related U.S. Application Data

(63) Continuation of application No. 16/953,083, filed on Nov. 19, 2020, now Pat. No. 11,349,815, which is a (Continued)

(51) Int. Cl.
*H04L 9/40* (2022.01)
*H04L 12/46* (2006.01)
(Continued)

(52) U.S. Cl.
CPC ........ *H04L 63/029* (2013.01); *H04L 12/4633* (2013.01); *H04L 63/0209* (2013.01);
(Continued)

(58) Field of Classification Search
CPC ............... H04L 63/029; H04L 63/0209; H04L 63/0281; H04L 63/083; H04L 63/0884; H04L 12/4633; H04L 67/02; H04L 67/56
See application file for complete search history.

(56) References Cited

U.S. PATENT DOCUMENTS 7,958,347 B1* 6/2011 Ferguson ................ H04L 9/321
726/8
9,154,479 B1* 10/2015 Sethi ........................ H04L 63/20
(Continued)

OTHER PUBLICATIONS

Traffic Classification for the Detection of Anonymous Web Proxy Routing, Miller et al., published Mar. 2015 (Year: 2015).*
(Continued)

*Primary Examiner* — Vu V Tran
(74) *Attorney, Agent, or Firm* — Sprinkle IP Law Group

(57) ABSTRACT

A system having an off-premises proxy server residing in a cloud computing environment and backend servers residing in an enterprise computing environment are provided. Requests received by the off-premises proxy server for access to a first, non-publicly accessible backend server are routed to a tunnel server which stores the request and waits to be polled by a tunnel agent connected to the first backend server. When the tunnel server is polled, the request is forwarded through an HTTP tunnel to the tunnel agent, which forwards it to the backend server for processing. Responsive information is returned to the tunnel agent, which forwards it through the HTTP tunnel to the tunnel server and returned through the off-premises proxy server to the remote application. Requests for access to a first, publicly accessible backend server are routed by the off-premises proxy server directly to the backend server for processing and return of responsive information.

20 Claims, 7 Drawing Sheets

Related U.S. Application Data continuation of application No. 16/018,886, filed on Jun. 26, 2018, now Pat. No. 10,873,567.

(60) Provisional application No. 62/524,844, filed on Jun. 26, 2017.

(51) Int. Cl.
*H04L 67/02* (2022.01)
*H04L 67/56* (2022.01)

(52) U.S. Cl.
CPC ........ *H04L 63/0281* (2013.01); *H04L 63/083* (2013.01); *H04L 63/0884* (2013.01); *H04L 67/02* (2013.01); *H04L 67/56* (2022.05)

(56) References Cited

U.S. PATENT DOCUMENTS

| | | | | |
|---|---|---|---|---|
| 10,079,854 B1* | 9/2018 | Scott | .................. | H04L 67/02 |
| 10,374,869 B2* | 8/2019 | Jain | .................. | H04L 41/046 |
| 10,425,465 B1* | 9/2019 | Jha | .................. | H04L 67/565 |
| 10,873,567 B2 | 12/2020 | Rawat et al. | | |
| 2002/0161904 A1* | 10/2002 | Tredoux | .............. | H04L 63/0281 |
| | | | | 709/229 |
| 2014/0006347 A1* | 1/2014 | Qureshi | ................ | H04W 12/06 |
| | | | | 707/783 |
| 2016/0197830 A1 | 7/2016 | Ulevitch | | |
| 2016/0308974 A1* | 10/2016 | Chadzelek | ............ | H04L 67/025 |
| 2017/0264460 A1* | 9/2017 | Coleman | ............. | H04L 65/1066 |
| 2018/0287920 A1 | 10/2018 | Sanganabhatla | | |
| 2018/0375828 A1 | 12/2018 | Rawat et al. | | |
| 2021/0075764 A1 | 3/2021 | Rawat et al. | | |

OTHER PUBLICATIONS

Office Action issued for U.S. Appl. No. 16/018,886, dated Apr. 28, 2020, 26 pages.

Notice of Allowance issued for U.S. Appl. No. 16/018,886, dated Aug. 19, 2020, 11 pages.

* cited by examiner

SYSTEMS AND METHODS FOR PROVIDING COMMUNICATIONS BETWEEN ON-PREMISES SERVERS AND REMOTE DEVICES

This application is a continuation of, and claims a benefit of priority under 35 U.S.C. 120 of the filing date of U.S. patent application Ser. No. 16/953,083, filed Nov. 19, 2020, issued as U.S. Pat. No. 11,349,815, entitled "SYSTEMS AND METHODS FOR PROVIDING COMMUNICATIONS BETWEEN ON-PREMISES SERVERS AND REMOTE DEVICES," which is a continuation of, and claims a benefit of priority under 35 U.S.C. 120 of the filing date of U.S. patent application Ser. No. 16/018,886, filed Jun. 26, 2018, issued as U.S. Pat. No. 10,873,567, entitled "SYSTEMS AND METHODS FOR PROVIDING COMMUNICATIONS BETWEEN ON-PREMISES SERVERS AND REMOTE DEVICES," which claims a benefit of priority under 35 U.S.C. § 119(e) from U.S. Provisional Application No. 62/524,844, filed Jun. 26, 2017, entitled "SYSTEMS AND METHODS FOR PROVIDING COMMUNICATIONS BETWEEN ON-PREMISES SERVERS AND REMOTE DEVICES," the entire contents of which are hereby expressly incorporated by reference for all purposes.

TECHNICAL FIELD

This disclosure relates generally to the field of computer systems, and more particularly to the field of communications between servers providing backend services and remote devices running client applications through cloud-based proxy servers, where a portion of the communications involve HyperText Transfer Protocol (HTTP) tunneling between the proxy servers and backend servers.

BACKGROUND OF THE RELATED ART

Many different types of computing services are provided through distributed networks of devices. On-premises software (sometimes abbreviated as "on-prem") is installed and runs on computers on the premises (e.g., in the building) of a person or organization using the software, rather than at a remote facility such as a server farm or cloud. For example, backend server applications may be resident on a provider's premises, and these server applications may serve data through one or more networks to client applications that are remote from the provider's premises.

In some cases, the provider's server applications may be modified to be resident outside the provider's premises (e.g., hosted in the cloud), where they can be accessed by the remote client applications (e.g., through a software as a service delivery model). Typically in these "off-premises" scenarios, the backend server applications are visible to any remote device. While this arrangement may provide quick and simple access to the backend server applications, it may also leave them vulnerable to attacks from the remote devices. The modification of the backend server applications may also involve security audits, monitoring topology, and various other tasks which may be very time-consuming and expensive.

It would be desirable for the provider to be able to provide services that are accessible through the cloud from remote devices without having to modify the server applications to allow this access, and without exposing the backend servers on their premises to attacks from remote devices.

SUMMARY OF THE DISCLOSURE

Embodiments disclosed herein can address the aforementioned drawbacks and provide additional technical solutions and benefits. For example, one or more embodiments of the invention may provide cloud-based access to backend servers while also providing increased security for the backend servers by communicating with the servers using HyperText Transfer Protocol (HTTP) tunnels, where communications through the HTTP tunnels are initiated by agents that are on-premises with the servers. These embodiments enable the backend servers to provide services to remote applications through a cloud network without the need to modify backend server applications that are already configured to allow local or VPN access. Embodiments of the invention may also provide increased load handling capabilities and the ability to direct communications alternately through secure and non-secure channels.

Embodiments disclosed herein provide a new system, method, and computer program product for providing remote access through a cloud network to one or more backend servers. In some embodiments, a cloud-based proxy server is coupled to one or more backend servers that reside on the premises of corresponding service providers. The proxy server includes a proxy service and a tunnel service. At least a first one of the backend servers is coupled to a tunnel agent that communicates with the tunnel service in the proxy server. Other backend servers may communicate directly with the proxy service. The proxy server is configured for receiving from one or more remote applications requests for access to the backend servers.

Initially, the host name contained in a request is used to check for a tenant-connection and tenant name associated with the request. A number associated with an active, open request for a tenant-connection can be kept in memory and, if the request fails due to a communication failure, then a configurable number of retries may be performed. The proxy service can check with a management service to get detailed connection information for the connection-tenant combination. The management service returns information such as whether the requested backend service is publicly accessible, the entry point to the backend service (e.g., a particular universal resource locator (URL) or network address), the associated tunnel server port, the number of tunnel servers actively connected to agents, the number of agents, etc. The information that is received from the management service can be cached by the proxy service.

If the on-premises backend server is publicly accessible, the request is routed directly to the backend server using the URL entry point from the management service. The request is processed by the backend server to generate responsive information. The responsive information is returned directly to the proxy service, which forwards the information to the requesting application.

If the requested backend server is not publicly accessible, the request is routed to a tunnel server. To do so, the proxy service checks the tunnel store for the appropriate tunnel servers and agents that implement the tunneling communication channel associated with the backend server that can provide the responsive information. The proxy service routes the request to that tunnel server and the tunnel server then forwards the request through a tunnel-connection to the tunnel agent that resides on-premises with the backend server. The tunnel agent forwards the received request to the backend server, which processes the request and generates responsive information. The responsive information is returned to the tunnel agent, which in turn forwards the information through the tunnel to the tunnel server. The tunnel server provides the received information to the proxy service, which forwards the information to the requesting application.

Embodiments of the invention may provide a number of benefits. For instance, the backend servers that are accessed by way of HTTP tunneling are made accessible to remote devices and applications without having to be modified to run in the cloud. Consequently, the cost, complexity, and loss of time associated with the modifications are avoided. Further, because the backend servers accessed by way of HTTP tunneling remain on the premises of the service provider and because communications with these servers are controlled by tunnel agents, the servers are protected from attacks to which they would be exposed if implemented in the demilitarized zone (DMZ) or in the cloud. While the system reduces cost and complexity, yet provides protection for the tunnel-accessible backend servers, the system is transparent to remote applications, which can access both the tunnel-accessible backend servers and the directly-accessible backend servers in the same manner.

One embodiment is a system for providing remote access through a cloud network to one or more backend servers, wherein the system includes an off-premises proxy server computer residing in a cloud computing environment and one or more backend server computers residing in an enterprise computing environment. The off-premises proxy server includes a proxy service and a tunnel service, while the one or more backend server computers include a first backend server computer which is not publicly accessible and which is communicatively connected to a tunnel agent that communicates with the tunnel service of the off-premises proxy server computer. The off-premises proxy server computer is configured to receive requests for access to the backend server computers. When a request for access to the first backend server computer is received, the request is routed to the tunnel server, which stores the request until it is polled by the tunnel agent. In response to being polled by the tunnel agent, the tunnel server forwards the request through a tunnel-connection to the tunnel agent. The tunnel server does not initiate the communication of the request to the tunnel agent. The tunnel agent then forwards the request to the first backend server computer, which processes the first request and generates responsive information. This responsive information is returned by the first backend server computer to the tunnel agent, which in turn returns the responsive information to the tunnel server through the tunnel-connection. The tunnel server then provides the responsive information to the off-premises proxy server computer, which provides the responsive information to the remote application.

The system may also include a second backend server computer which is publicly accessible and which is communicatively connected to the off-premises proxy server computer. When the off-premises proxy server computer receives a request for access to the second backend server computer from the remote application, it routes the request to the second backend server computer without having to go through the tunnel-connection between the tunnel server and the tunnel agent. The second backend server computer processes the request, generates responsive information, and returns the responsive info to the off-premises proxy server computer. The off-premises proxy server computer then provides the responsive information to the remote application.

When the off-premises proxy server computer receives a request for access to one of the backend server computers, it may check a host name contained in the received request, determine a tenant-connection and tenant name associated with the request, and route the request appropriately. If the tenant-connection and tenant name are associated with the first backend server computer, the request is routed to the tunnel server, and when they are associated with the second backend server computer, the request is route directly to the second backend server computer. While the first backend server computer is not directly accessible by off-premise applications, it may be directly accessible by on-premise applications.

In one embodiment, the tunnel agent is configured to poll the tunnel server for stored requests for access. When the tunnel agent polls the tunnel server and receives no response for a predetermined amount of time, the tunnel agent may attempt to re-establish a connection to the tunnel server. When the tunnel server determines that the tunnel agent has not polled the tunnel server for a predetermined amount of time, the tunnel server may update a tunnel store to remove an entry associated with the tunnel-connection between the tunnel server and the tunnel agent. When the tunnel agent initiates a tunnel-connection between the tunnel server and the tunnel agent, the tunnel server may store a corresponding entry in the tunnel store in response to the tunnel agent initiating the tunnel-connection between the tunnel server and the tunnel agent.

An alternative embodiment may comprise a method which is implemented in a system for providing remote access through a cloud network to one or more backend servers. In this method, the system includes an off-premises proxy server computer having a proxy service and a tunnel service and residing in a cloud computing environment. The backend servers include a first backend server computer which resides in an enterprise computing environment, where the backend server computer is not publicly accessible and is communicatively connected to a tunnel agent that communicates with the tunnel service of the off-premises proxy server computer. The method includes receiving a first request for access to the first backend server computer, where the request is received by the off-premises proxy server computer from a remote application. The off-premises proxy server computer routes the first request for access to the tunnel server, which stores the first request for access. The tunnel server waits for a polling message from the tunnel agent, and only when the polling message is received, the tunnel server forwards the first request through a tunnel-connection to the tunnel agent. The tunnel agent then forwards the received first request to the first backend server computer, which processes the first request and generates first responsive information. The first backend server computer returns the first responsive information to the tunnel agent, which returns the information to the tunnel server through the tunnel-connection. The tunnel server then provides the first responsive information to the off-premises proxy server computer, which in turn provides the information to the remote application. The system may also include a second backend server computer which is publicly accessible and which is communicatively connected to the off-premises proxy server computer. When the off-premises proxy server computer determines that a request received from a remote application, is a second request for access to the second backend server computer, the off-premises proxy server routes the request directly to the second backend server computer. The request is processed by the second backend server computer to generate responsive information which is returned to the off-premises proxy server computer, which provides it to the remote application.

An embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
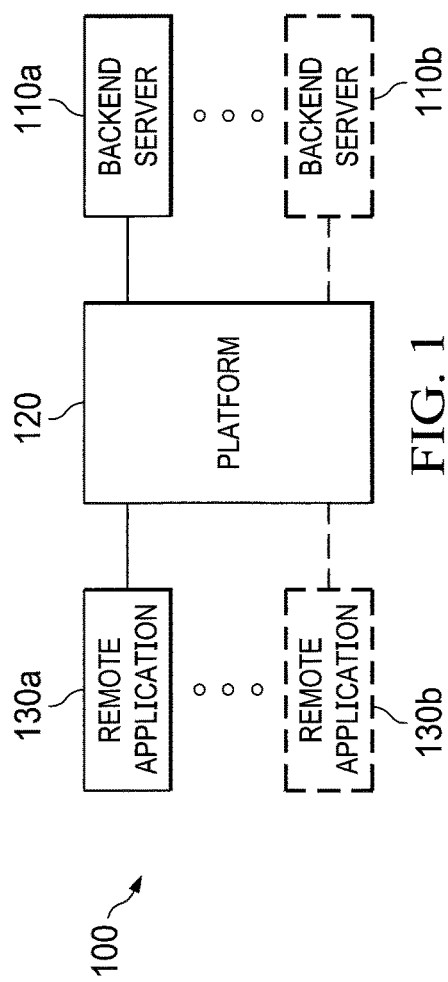
FIG. 1 depicts a diagrammatic representation of an exemplary system configured for providing communications between on-premises servers and remote devices according to some embodiments.

FIG. 1 depicts a diagrammatic representation of an exemplary system in accordance with some embodiments of the invention. In this example, the system 100 includes at least one server 110 that is communicatively coupled to a cloud-based platform 120 that provides a proxy service. One or more remote client devices 130 can communicate with platform 120 and can access the services provided by server 110 through platform 120. Platform 120 is configured to communicate with at least one server 110 by way of Hyper-Text Transfer Protocol (HTTP) tunneling channels. The communications over these tunneling channels are initiated by server 110 so that the server cannot be indiscriminately accessed by all remote devices.

It should be noted that some of the reference numbers used in the drawings include lowercase letters (e.g., 110a, 110b, etc.) For the purposes of this disclosure, citations to a reference number without a lowercase letter is intended to include any or all of the items that are indicated in the drawings by the reference number with a lowercase letter. Citations in the text to a reference number with a lowercase letter are intended to refer to the specific item in the drawings indicated by that specific reference number and lowercase letter.

Figure 2:
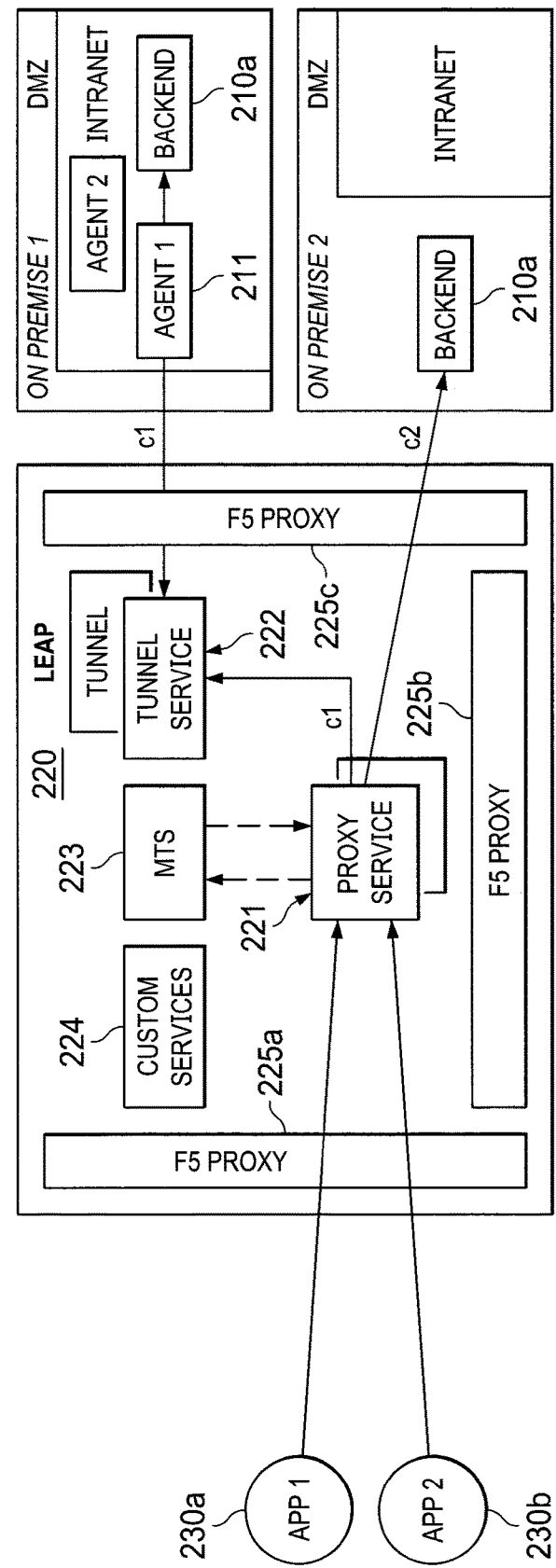
FIG. 2 depicts a diagrammatic representation of an exemplary system configured for providing a combination of HyperText Transfer Protocol (HTTP) tunneling communication channels and direct communication with backend servers according to some embodiments.

FIG. 2 depicts a more detailed diagrammatic representation of exemplary system 100, in accordance with some embodiments of the invention. In this exemplary embodiment, platform 220 is a cloud-based platform. ("Cloud-based" is known in the computing field to refer to Internet-based computing that can be used to provide shared computer processing resources and data to computers and other devices on demand.) Platform 220 includes servers that provide proxy service 221, tunnel service 222, management service 223, and various custom services 224. Apart from proxy service 221, platform 220 also includes several hardware proxy servers 225.

Platform 220 is communicatively coupled to backend servers 210 on the premises of their respective service providers. Backend servers 210 provide services to customers (e.g., applications 230) of the service providers. In this embodiment, server 210a is behind the corresponding DMZ (a demilitarized zone, or perimeter network), so it can be accessed from the on-premises intranet, but cannot be directly accessed from remote devices and applications through the cloud. Instead, a tunneling agent 211 is coupled to server 210a to enable communication by way of HTTP tunneling with tunnel service 222 of platform 220. Backend server 210b, on the other hand, resides within the DMZ of the corresponding service provider, and can therefore be directly accessed through the cloud by remote devices and applications.

FIG. 2 depicts two applications 230a-b that are executing on remote client devices. ("Remote" is used herein to refer to devices, applications, etc. that are located physically outside the premises in which the backend servers 210 reside, and which access the backend servers through the cloud.) When the applications 210 executing on the remote client devices want to access the backend servers 210, the applications communicate requests for the backend services to proxy service 221. These communications, as well as other communications to or from proxy service 221, may be made through one of hardware proxy servers 225. When proxy service 221 receives one of these requests, it determines the customer (or tenant) and the connection associated with the request. Proxy service 221 then communicates with MTS 223 to identify the details necessary to forward the request to the appropriate one of the backend servers 210.

If the backend server is publicly accessible, the request is forwarded directly to the backend server. For example, server 210b resides in the DMZ of its premises, so service requests that are directed to this server are routed directly from proxy service 221 to backend server 210b. If, on the other hand, the backend server is not publicly accessible, the request is forwarded to tunnel service 222, where it is stored until it can be forwarded to the appropriate tunnel agent. For instance, because backend server 210a resides behind the DMZ of its premises, so tunnel agent 211 communicates by way of an HTTP tunnel with tunnel service 222 to retrieve service requests that are directed to backend server 210a, and that had been stored by tunnel service 222. Tunnel agent then forwards the retrieved requests to backend server 210a.

When the service requests are received by backend servers 210, the servers generate data as needed to service the requests. In the case of publicly accessible servers such as server 210b, the results are returned through the cloud directly to the remote applications that requested them. In the case of backend servers that are not publicly accessible, such as server 210a, the results are returned to the corresponding tunnel agent 211, which then communicates the results to tunnel server 222 of platform 220. Tunnel server 222 forwards the received results to proxy service 221, which then returns them to the remote application in response to its request.

In one embodiment, the agent is deployed in a customer's data-center and is responsible for reading the tunneled messages and forwarding them to on-premise services, while the connectivity service (the tunnel service) runs in the cloud and exposes a public facing HTTPS end-point (a servlet) that is used by the agent to create tunnels, read tunneled messages, write tunneled responses and to destroy the tunnels.

In this embodiment, the agent sends an HTTP POST request (e.g., to http://cloud_host/connectivity/tunnel/createTunnel) to create a new tunnel. The end-point expects following three post parameters: agentId, agentPassword, and serviceName. agentId is the ID of the agent, agentPassword is the password of the agent, and serviceName is the service for which the tunnel is being created. For each tunnel, the connectivity service creates a new TCP server port and registers the port with a lookup service. The tunnel id (which may be a random string—similar to an HTTP session ID) is set in an HTTP cookie response. This is used in later calls by the agent to correlate the request with the tunnel.

The lookup service maintains a database with details of the agent. It updates the information when a new tunnel is created or destroyed. For each tunnel, the following information is maintained in one embodiment: agentId; service; connectivity service (private) IP; and connectivity service port. The agentId is the ID of the agent. Service is the on-premise service name for which the tunnel is created. Connectivity service (private) IP is the local IP of the connectivity service where proxy port is created for on-premise service. Connectivity service port is the proxy port for the on-premise service. The cloud service that wants to send a request to on on-premise service does following: Get the IP/proxy port for on-premise service from the lookup service, and send a request (HTTP or any-protocol) to the IP/proxy port.

To receive data, the agent sends an HTTP POST request (e.g., to http://cloud_host/connectivity/tunnel/receiveData URL) to get a byte-stream of tunneled messages. The agent parses the byte-stream and forwards the message to the appropriate on-premise service (socket). In order to send data, the agent sends an HTTP POST request (e.g., to http://cloud_host/connectivity/tunnel/sendData URL) to upload the byte-stream of responses from the services. The connectivity service parses the byte-stream and forwards the message to the appropriate cloud service (socket). When the Tunnel is no longer needed, the agent sends an HTTP POST request (e.g., to http://cloud_host/connectivity/tunnel/destroyTunnel URL) to destroy the tunnel. The service updates the tunnel status in the lookup service.

In some embodiments, proxy service 221 can be implemented as a standalone application within platform 220 (e.g., as a Netty application). Skilled artisans appreciate that Netty refers to an asynchronous event-driven, non-blocking input/output client-server framework for the development of Java network applications such as protocol servers and clients.

Proxy service 221 can be used by any application or service to communicate with an on-premises system such as backend servers 210. When proxy service 221 initializes, it can set up a channel that listens to all incoming HTTP/S requests. Proxy service 221 also can initialize information for connecting to a tunnel store which can be used to store load information for tunnel service 222. Tunnel service 222 can then determine which of the tunnel services should be used by proxy service 221 to re-route a request if the request is directed to a backend server (e.g., 210a) that communicates with the proxy service through tunneling channels.

The communication route at the proxy which accepts requests is non-secure with respect to the end-point at proxy service 221, as it is a pass-through (no authorization service is involved). Security with respect to the end-point invocation is provided at the backend service. The HTTP request can contain all the headers and other info from the original request that are required for the authentication and authorization by the backend service which is to be invoked. An application can retrieve the connection name and tenant name associated with it. In some applications, a 'business service' URL (universal resource locator) parameter can be retrieved as part of the call to retrieve the application parameters and the endpoint for the 'business api' communication.

Figure 3:
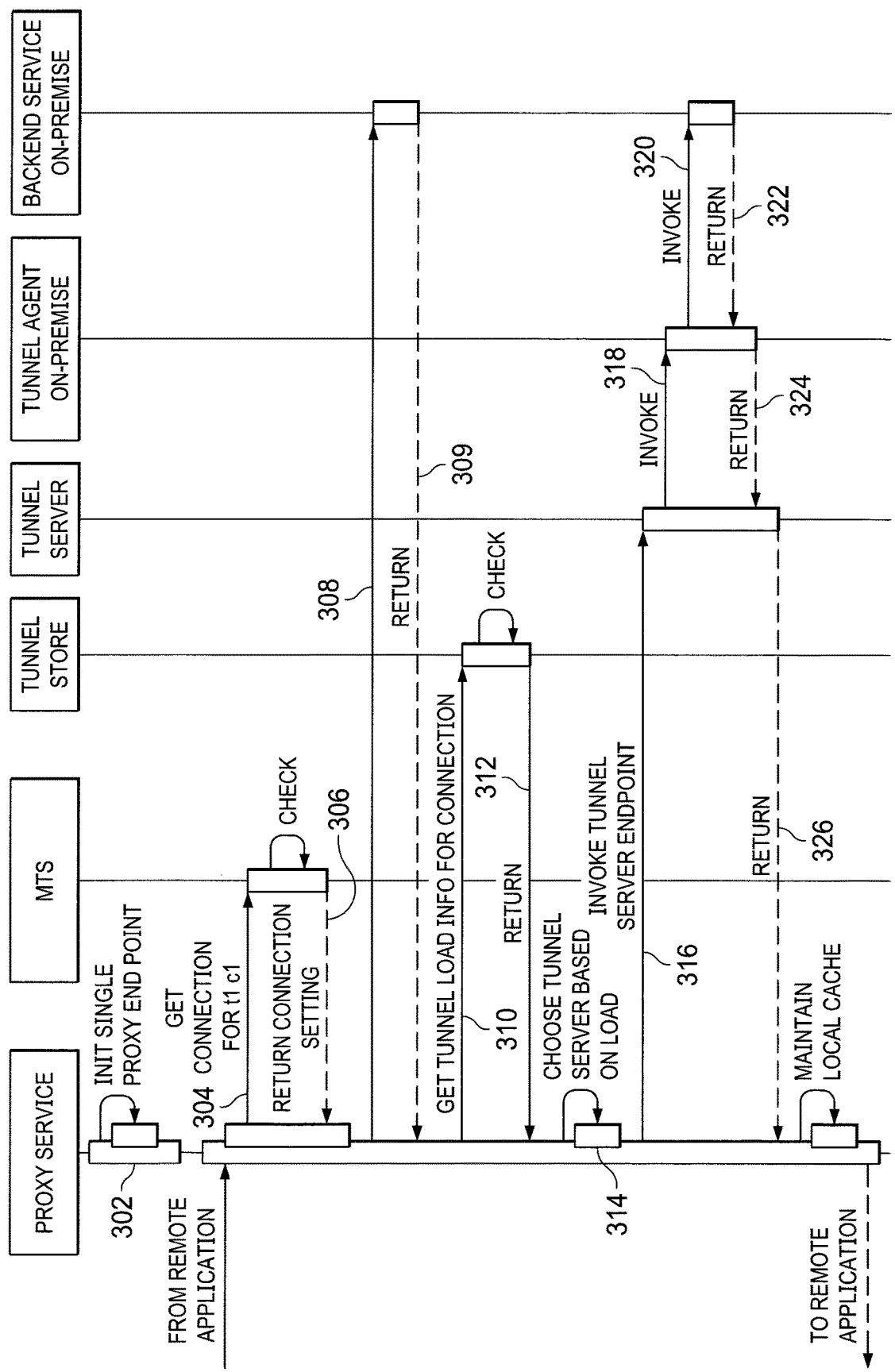
FIG. 3 depicts a sequence diagram illustrating the processing of incoming requests according to some embodiments.

In some embodiments, incoming requests can be processed as shown in the sequence diagram of FIG. 3. Initially, the host name can be used to check for the connection and tenant name associated with the request (302). A number associated with an active, open request for a tenant-connection can be kept in memory and, if the request fails due to a communication failure, then a configurable number of retries may be performed. The tunnel server for each retry is chosen applying the chosen algorithm, and the tunnel store is updated by the tunnel server as appropriate for the retries. The proxy service can check with a management service to get detailed connection information for the connection-tenant combination (304). The management service returns information such as whether the requested backend service is publicly accessible, the URL entry point to the backend service, the associated tunnel server port, the number of tunnel servers actively connected to agents, the number of agents, etc. (306). The information that is received from the management service can be cached by the proxy service.

If the on-premises backend server is publicly accessible, the request is routed directly to the backend server using the URL entry point from the management service (308). The request is processed by the backend server to generate responsive information, and this information is returned directly to the proxy service (309), which forwards the information to the requesting application.

If the requested backend server is not publicly accessible, the request is routed to a tunnel server, so the proxy service checks the tunnel store for the appropriate tunnel servers and agents that implement the tunneling communication channel associated with the backend server (310). This information is returned to the proxy service (312) and is cached by the proxy service. The proxy service then uses a load balancing algorithm to pick the tunnel server to which the request will be routed (314). The load balancing algorithm may implement various techniques, such as a least-used connection, weighted least-used connection, round robin, or others. When the appropriate tunnel server has been chosen, the proxy service routes the request to that tunnel server (316). The tunnel server waits for a tunnel agent that resides on-premises with the backend server to initiate communication with the tunnel server (e.g., polls the tunnel server) and then forwards the request through an HTTP tunnel to the tunnel agent (318). The tunnel agent forwards the received request to the backend server (320), which processes the request and generates responsive information. The responsive information is returned to the tunnel agent (322), which in turn forwards the information by way of the HTTP tunnel to the tunnel server (324). The tunnel server provides the received information to the proxy service (326), which finally forwards the information to the requesting application.

As noted above, the proxy service can provide load balancing using various techniques. For instance, in a least-used connection scheme, the tunnel store maintains a number of active connections for each tunnel server, and the server that has the lowest number of requests being actively processed will be selected. In a weighted least-used connection scheme, each of the tunnel servers is weighted so that servers which are assigned higher weights will have a corresponding higher likelihood of being selected for new connections. In addition to load balancing, the proxy service may be configured to throttle requests from particular users, depending upon their respective subscriptions to the service. It should be noted that load balancing may be performed by the hardware F5 proxy servers as well as proxy service 121. The F5 proxy servers may also be configured to handle denial of service (DOS/DDOS) attacks.

The system can use one or multiple tunnel servers. At a high level, the tunnel servers are responsible for validating tunnel agent authentication credentials with a configured authentication service. The tunnel servers retrieve agent configuration from a management service (e.g. MTS) and manage the agent session and tunneling ports. The tunnel servers receive messages from cloud applications and services, read and queue messages, handle connections, and hand over the messages to the tunnel agent, which is responsible for forwarding the messages to the backend (on-premise servers). The tunnel servers receive message responses from tunnel agents and forward them to the applications and services.

In one embodiment, the tunnel servers are application and service agnostics—they can handle message tunneling for known applications and services and, with additional plugins (e.g. authentication and configuration), they can be extended to handle additional applications and services. The tunnel servers may be message protocol agnostics that can handle forwarding messages of many different types, such as HTTP, FTP, and plain TCP/IP. The tunnel servers may provide support to handle HTTP methods such as sending GET, PUT, POST, and DELETE over the tunnel (including uploading and downloading files). Both the tunnel servers and the tunnel agents can, however, handle more than HTTP-based tunneling.

The tunnel servers can handle multiple tunnel agent instances for the same backend service. For backend services with multiple agent instances, the tunneling servers use load balancing mechanisms to select the appropriate tunnel instance queue for pushing the incoming messages. Configuration options for both the tunnel servers and tunnel agents may be externalized so that the configuration parameters can be controlled through such means as environment variables, java system properties, or custom properties files. The tunnel servers can have backend recurring jobs to clean up orphan agent sessions, dead tunnel agents and tunnels, and timed out and orphan connections (in case a user closes browser a window). The tunnel servers may have end-to-end message traceability so that every message which is processed by the tunnel server and tunnel agent are tracked. Important events and process information can be logged with information such as request context, message life cycle, etc. Consolidated metrics data collection can be provided, with the tunnel Server and Agent capturing such information as message processing timing across stages and message size information, and storing this information in a common access log at the tunnel server end.

At high level, the tunnel agents are responsible for authenticating themselves with a configured authentication service. The tunnel agents are also responsible for opening up the tunneling port with the tunnel servers, polling for queued messages from the tunnel servers, and forwarding the polled messages to the backend servers, as well as returning responses (and any communication errors) from the backend servers to the tunnel server.

The tunnel agents preferably support following authentication schemes like OAuth2 base client credentials and HTTP Basic in order to interact with the tunnel servers. The tunnel agents may be backend service protocol agnostics so that, like the tunnel servers, the same agent installation can talk to multiple backend services which require different protocols (e.g. HTTP, FTP, etc.) for communication. One agent instance can be configured to handle message forwarding requests for multiple backend servers.

Apart from configuring tunnel server URLs and agent credentials, no major configuration is required, but for advance usage, any configuration customization could be achieved through multi-level configuration capability. The tunneling agents may process received messages in real time, so that instead of queuing the messages, they may be polled for forwarding. This mechanism may require more threads than using push and poll, but it may be possible to use a thread poll mechanism which is available in java to optimize this. One agent installation can be configured to handle multiple back-end service messages, by creating sandboxed agent instances. In this case, each provided agent configuration can be scoped to individual agent instances. This would enable the individual agent instances to be started and stopped through a management UI or a command console.

The system can also use one or multiple agents that are associated with each non-publicly-accessible backend server. For a particular tenant, there can be more than one or more agents that serve one or more backend services. If there is only one instance of a tunnel server, all of the agents will, after being authenticated by an authentication service, open connections to the single tunnel server. In this embodiment, the proxy service is bound to the tunnel server using an environment variable in the environment of the consuming service (or client). In an embodiment in which more than one tunnel servers is used (to support high availability, for example), an agent can be authenticated before initiating open connection with one of the tunnel servers. An F5 proxy can load balance and assign the agent to a tunnel server. Each of the agents is connected to only one of the servers. Through session stickiness, each agent can stay connected to the assigned tunnel server until the server is no longer reachable or the agent is shutdown.

The agents may be designed to support resiliency when the tunnel servers to which they are connected to are no longer reachable. In other words, if any agents that are connected to a tunnel server are not able to reach the server during the regular heartbeat checking, the agent then attempts to re-connect to the tunnel server. If the tunnel server cannot be reached, an F5 proxy can assign the agent to the next available tunnel server. The new tunnel server that accepts the connection from the agent can then update the tunnel store. The proxy service can typically also get a failure upon sending a request to the tunnel server. In the case of failure due to an unreachable tunnel server, the proxy service should then retry (one or more times) to send the same request again, but excluding the unreachable server. If a tunnel agent is no longer reachable, the tunnel server to which the agent is connected cannot receive heartbeat checking. In that event, the server then should update the tunnel store accordingly.

The tunnel store is a structure that is used to keep track of state of the tunnel servers and agents. This information is used by the proxy service to load balance requests to the tunnel servers and to decide to which tunnel server to which each request should be routed. The tunnel store is updated in several scenarios, such as when an agent is connected to a tunnel server, when a tunnel server is unreachable and the agents have to reconnect to other tunnel servers, and when agents become unreachable (the corresponding tunnel servers do not receive a "heartbeat" from the agent for a predetermined period of time).

Figure 4:
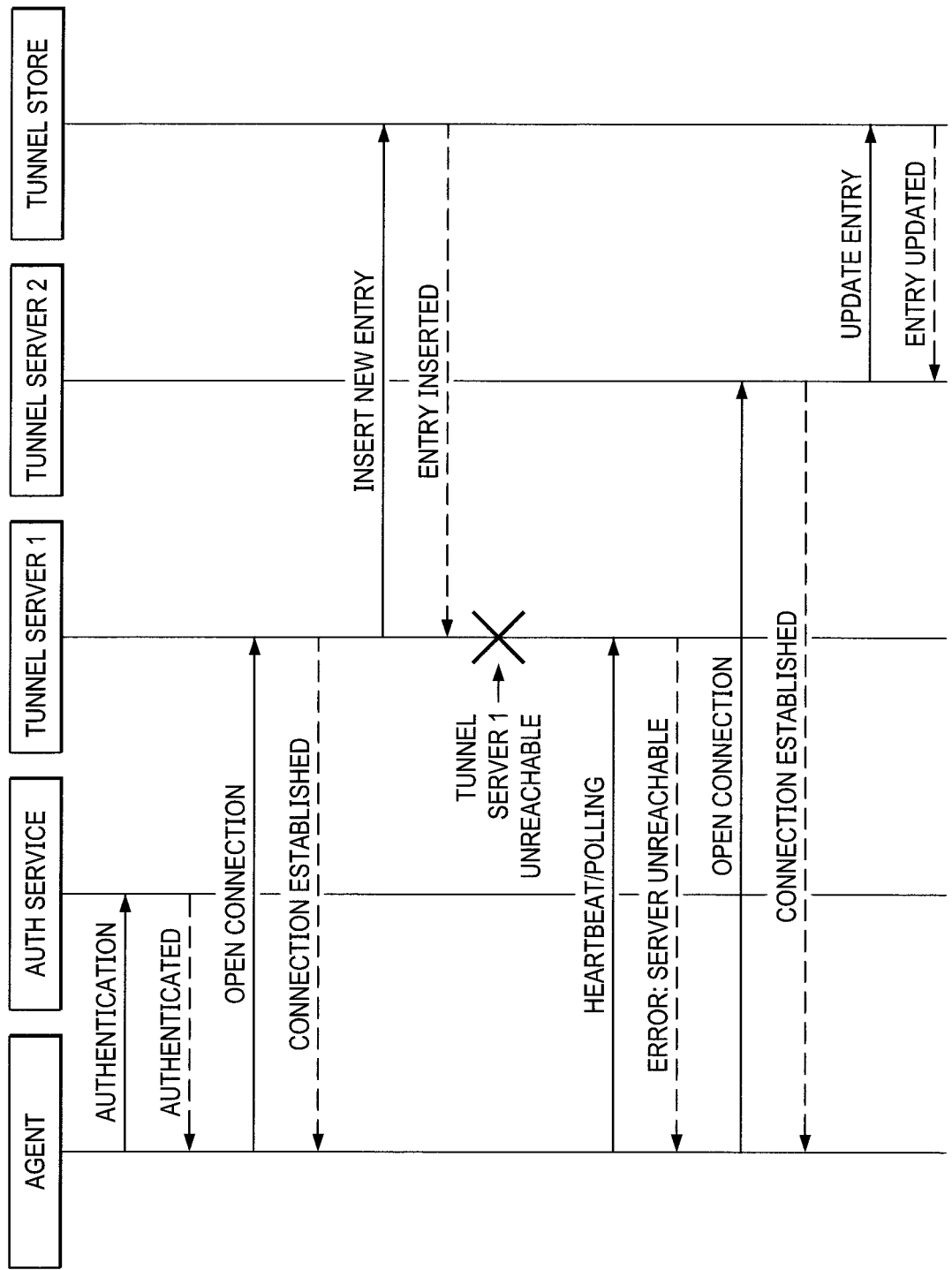
FIG. 4 depicts a sequence diagram illustrating communications between an agent, tunnel servers, and a tunnel store when a tunnel server becomes unreachable, according to some embodiments.
Figure 5:
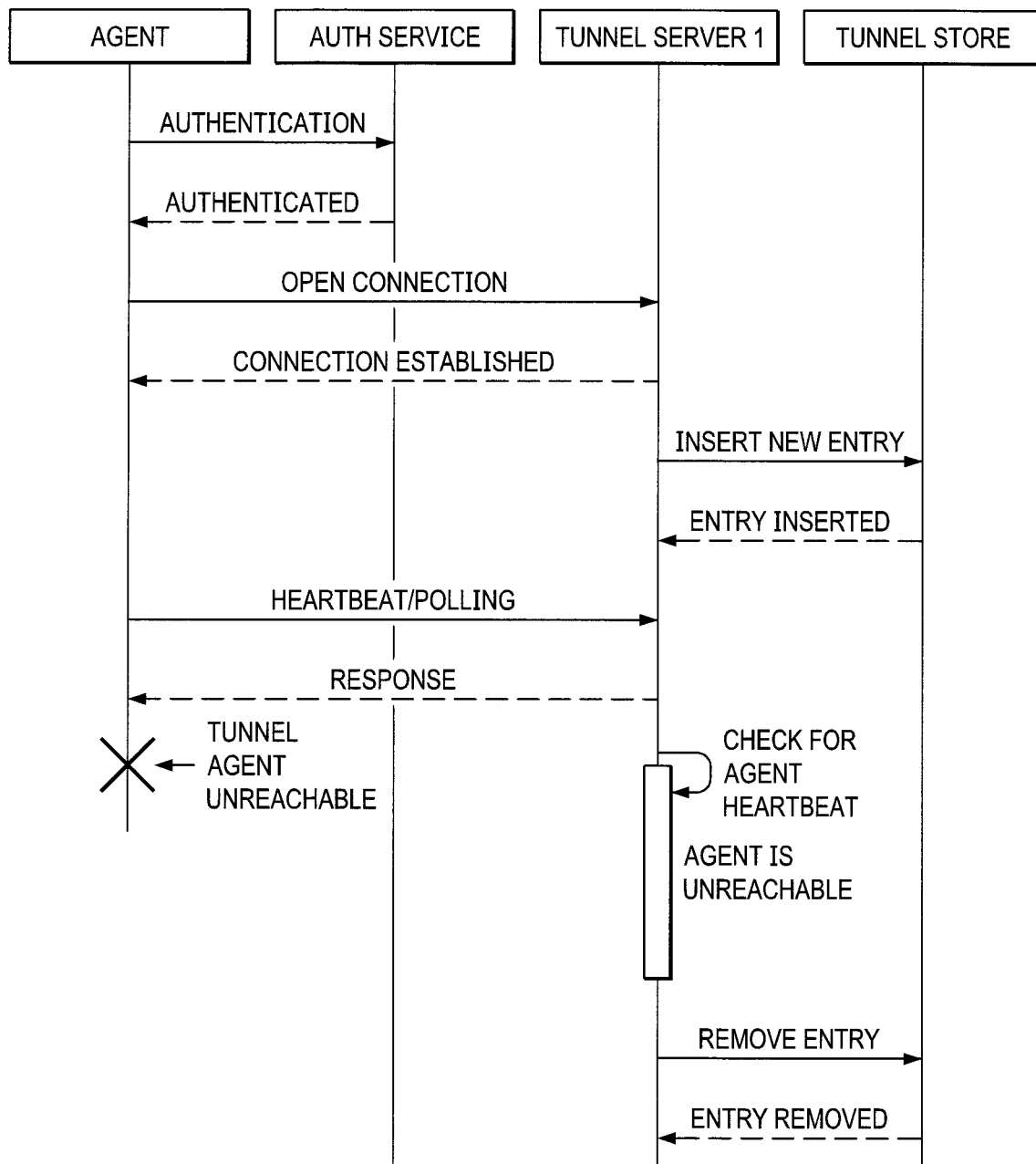
FIG. 5 depicts a sequence diagram illustrating communications between an agent, a tunnel server, and a tunnel store when the agent becomes unreachable, according to some embodiments.

When an agent is first connected to a tunnel server, the server creates a new entry that may store data such as a tunnel/connection name, a tenant name, a tunnel port, a tunnel agent name, and a server IP address. When a tunnel server becomes unreachable, each of the agents that was connected to the server can try to connect the next available tunnel server, and the new tunnel server that is associated with the agent can update the entry for that particular agent. The interaction between the agent, tunnel servers and tunnel store is illustrated in FIG. 4. FIG. 4 also depicts the interaction between the agent and an authentication service, where the agent is authenticated before establishing a connection to the tunnel server. When an agent is unreachable, the tunnel server to which it was previously connected can remove the entry for that particular agent from the tunnel store. The interaction between the agent, tunnel server and tunnel store in the case of the agent becoming unreachable is illustrated in FIG. 5.

As noted above, the tunneling channels are initiated by the tunneling agent so that the server cannot be indiscriminately accessed by any remote device. The tunneling agent is responsible for authenticating itself and initiating the tunneling channel by opening a tunneling port at the tunnel server. After the connection with the tunneling server has been established, the agent polls the server to determine whether the server has any messages for the agent (requests for the backend server associated with the agent). If the tunnel server has any messages, they are forwarded to the agent in response to the polling. This polling serves as a "heartbeat" from which the tunnel server determines whether the connection to the agent remains established—if no polling signal is detected for some predetermined interval, the server can determine that the connection has been lost, and the agent is unreachable.

When an agent is connected to a tunnel server, it is possible to forward multiple backend requests, or to return multiple backend responses over common tunneling channels. This is accomplished in some embodiments by using data chunking. "Chunking" refers to techniques in which a data message (e.g., a request or response) is broken into pieces, or "chunks", which are transported over a data channel (in this case an HTTP tunneling channel) and are then reassembled into the original message before being delivered to their destination. Because the channel transports each data message in chunks, chunks of different data messages can be interspersed with each other to effectively transport the messages in parallel over the same channel.

Figure 6:
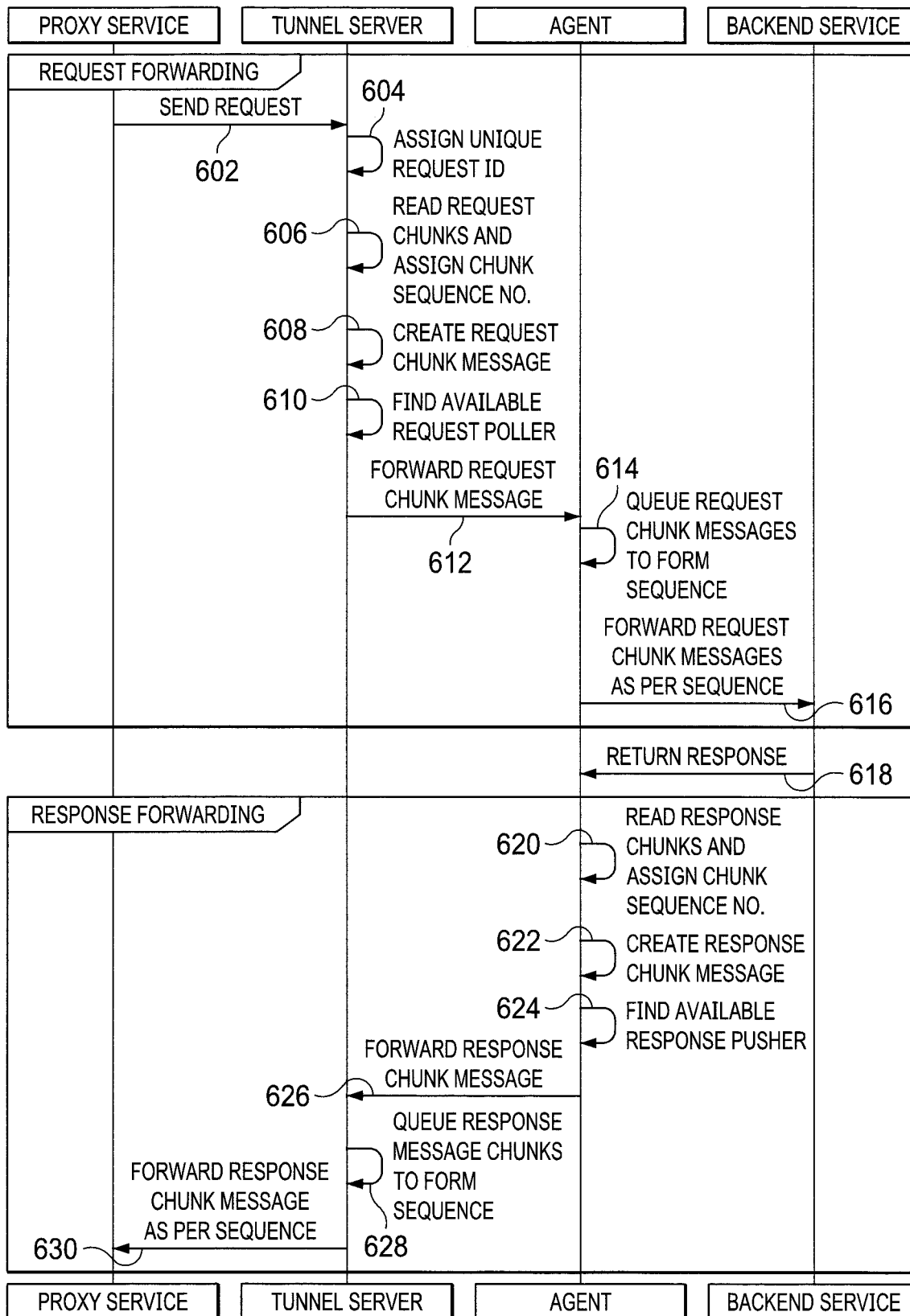
FIG. 6 depicts a sequence diagram illustrating transmission of messages by way of an HTTP tunneling channel using chunking according to some embodiments.

FIG. 6 illustrates the sequence of operations involved in the transmission of a data message in some embodiments using chunking. The sequence depicted in the figure begins with the proxy service sending a request to the tunnel server (602). When the tunnel server receives the request, it assigns a unique identifier to the request (604). The request is divided into chunks and each chunk is assigned a sequence number (606). The tunnel server then creates a separate message for each chunk (608). Each of these chunk messages can include the request identifier and chunk sequence number, as well as information such as the message length, the data payload (the actual chunk of the request) and whether the message is the end of the request. When the tunnel server is polled by the tunnel agent, the tunnel server detects this (610), and the next chunk message is transmitted to the agent (612). When the agent has received the chunk messages, it parses the messages to retrieve the chunks and queues them in the appropriate order (according to their sequence numbers) to reassemble the chunks into the original request (614). The request is then forwarded to the backend server (616).

After the backend server generates a response to the request, the response is forwarded from the backend server to the tunnel agent (618). When the tunnel agent receives the response, it divides the response into chunks and each chunk is assigned a sequence number (620). The tunnel agent then creates a separate message for each chunk of the response (622). Each of these chunk messages includes the request identifier (for the request with which the response is associated), chunk sequence number, the message length, the data payload (the chunk of the response), whether the message is the end of the request, and an error code. When the tunnel agent can find an available response pusher (624), it transmits the chunks back to the tunnel server (626). When the tunnel server has received the chunk messages, it parses the messages to retrieve the chunks and queues them according to their sequence numbers to reassemble them into the original response (628). The response is then forwarded to the proxy service (630).

The tunnel agent can support proxy authentication, which can be optionally configured if the customer premise uses a forward proxy to make any outbound requests from its network. In some embodiments, the tunnel agent deployed in the on-premises customer environment has support for basic HTTP client proxy authentication. The client proxy's username and password are configured in the agent-config.properties which are used by the tunnel agent to perform proxy authentication. The tunnel agent uses Netty's HTTP-ProxyHandler as one of the pipeline handlers to perform a basic authentication against the client proxy. The agent appends a Base64 encoded username password value to the proxy as part of the "proxy-authorization" request header along with every request. In this way, every request is authenticated at the proxy before leaving the network. This proxy authentication can also be configured to occur when the agent invokes the backend service. If the proxy requires an NTLM-based authentication, this requirement can be worked around by deploying an intermediate proxy which authenticates the request with basic credentials and in turn authenticates to the actual client proxy using NTLM. The tunnel agent preferably supports more secure authentication mechanisms like NTLM or Kerberos natively, so that an intermediate approach can be avoided.

Figure 7:
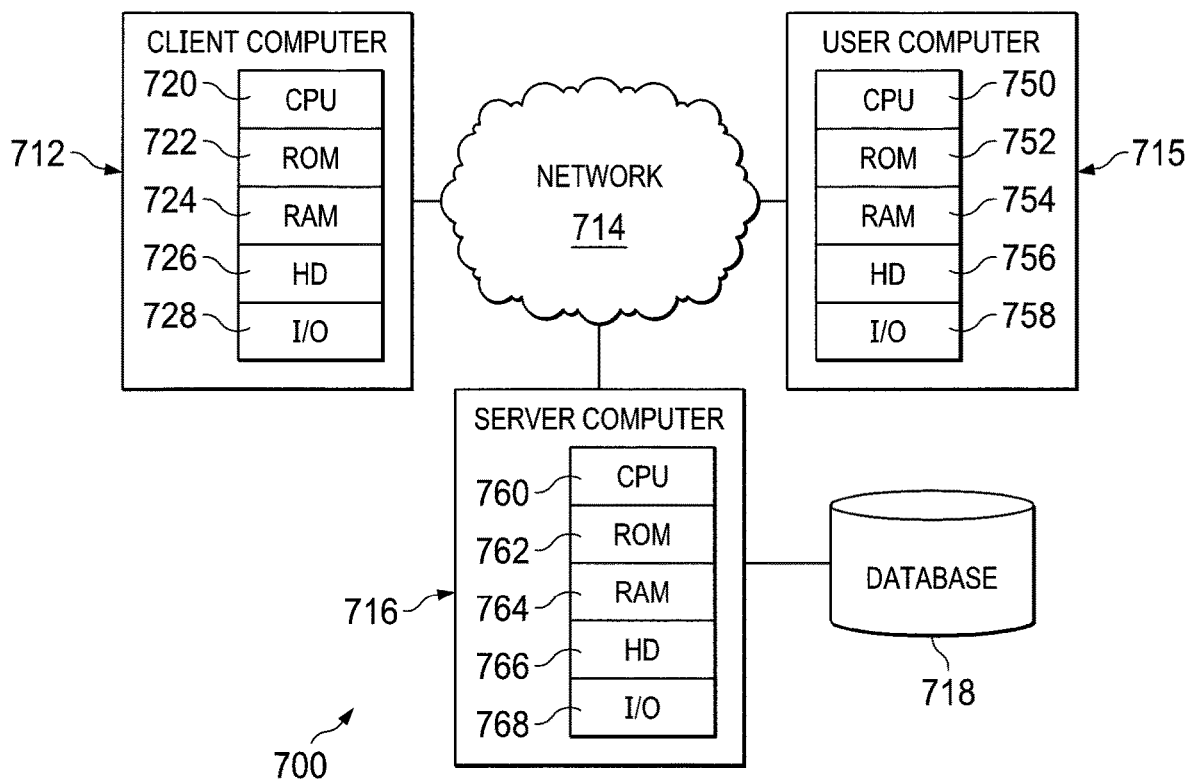
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. For instance, backend server 110 can be implemented on server computer 716 and database 718, platform 120 can be implemented on network 714 (with components similar to those depicted for user computer 715 or server computer 716 and database 718), and remote applications 130 can be implemented on client computer 712.

In the example illustrated, network computing environment 700 includes network 714 that can be bi-directionally coupled to computer 712, computer 715, and computer 716. Computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of computer 712, computer 715, and computer 716. However, with each of computer 712, computer 715, and computer 716, a plurality of computers (not shown) may be interconnected to each other over network 714. For example, a plurality of computers 712 and a plurality of computers 715 may be coupled to network 714. Computers 712 may include data processing systems for communicating with computer 716. Computers 715 may include data processing systems for individuals whose jobs may require them to configure services used by computers 712 in network computing environment 700.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing a variety of services to computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Figure 8:
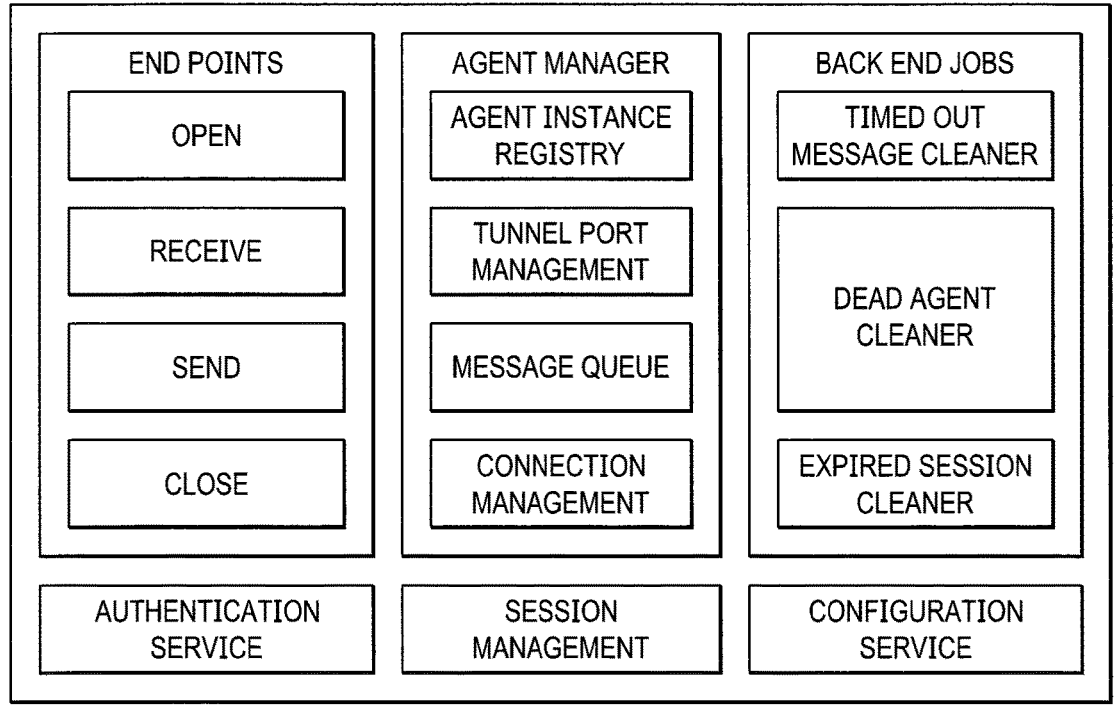
FIG. 8 depicts a diagrammatic representation of a tunnel server architecture according to some embodiments.

In one embodiment, the tunneling server includes components as shown in FIG. 8. The tunnel server shown in this figure, would have following key functionalities. The authentication service integrates with the authentication service to validate the JWT token coming from the Agent. The same authentication service JWT token would be used to fetch the subscription tunnel configuration from the MTS. Using the configuration service, the tunnel sever propagates some of well-defined parameters to agent to optimize communication. These parameters may include, for example, max polling connections, polling interval, and supported HTTP versions (this can be moved to agent configuration to enable customer administration to set the HTTP version supported by their IT governance.

The Tunnel Server exposes a well-defined set of end points to the agent. These end points enable the agent instance to perform various aspects of tunneling. With the agent instance management service, the tunnel server keeps track of all running agent instances. This involves managing things including the following:

running instances—list of all running instances per agent message handler—depending on the backend service communication type configuration, the sub-system would instantiate the message (aka channel handler)

message queues—list of all messages which are getting processed or yet to be processed. here, the sub-system also takes care of linking the waiting socket with the message, so that once the message is processed, the response can be directly written on the socket.

tunnel management—this service takes care of opening and closing the tunnel port.

message processing metrics collection—each message coming to the tunnel server goes through various phases at server and agent side. The consolidated processing time metrics are collected and logged by this sub-system.

backend cleanup jobs—there are various periodic jobs run in the tunnel server to cleanup orphaned agent instances and their sessions and message sockets.

In the tunnel server—agent communication, it is always agent that initiates the call, so for agent, it is always an out bound call. This eliminates the need for opening up the port in customer data centers. The communication between tunnel server and agent is by default over HTTP protocol, but both tunnel server and agent are designed to enable support for web sockets and SSEs in the future. The overall communication between tunnel agent and server is done by the end points described below.

To perform tunnel port creation and end-to-end message flow between tunnel server and agent, the server provides the following end points targeted to be used by the agent.

Open—As shown in the open tunnel sequence diagram, this end point is accessed by the agent during initialization and auto recovery (Authenticate; Open the tunnel port; Fetch backend configuration from subscription). It should be noted that if there are multiple instances of agents pointing to same backend service, then the tunnel port would be opened only during the first agent instance registration.

The agent instance makes a GET call on this end-point, and along with authentication headers, the agent instance sends following details. Agent Name—Registered name/identifier of the agent, this enables Tunnel Server to fetch the agent configuration as well as perform additional validation. This can be the same as the subscription name, but in case a customer wants to use same agent installation for more than one back-end service, then the subscription name might not be a good idea.

Instance Name (Optional)—In case multiple agent instances are running for given agent name. This end point is accessed using a GET HTTP method, and the response of this end-point contains agent configuration JSON.

Receive—This end point is accessed by the agent on a continuing basis (polling) to fetch pending messages from the agent queue. The agents make GET calls on this end-point, and there can be one or more receive threads running per agent instance to poll for pending messages. If there are any pending messages, then the tunnel server responds to this end point with a message (wrapped inside an HTTP response), otherwise the tunnel server returns a NO CONTENT (204) response. Per request, the tunnel server sends one message to the agent. The tunnel server uses this end-point (along with Send) to note the last ping time of the agent instance. The response with the message also has a unique id (aka Message ID) to track the message response.

Send—This end point is accessed by the agent to return the message response returned by the back-end service. This end-point gets called by the agent instance as and when the message response is ready for delivery. The message response gets wrapped and sent inside HTTP request body content.

Close—The close end-point gets called by the agent during shutdown. In case the agent is unable to send the close request to the server before exiting, the server would cleanup this process after the configured idle no-communication threshold is crossed.

The following should also be noted about these end-points in some embodiments:

All end-points are secured and require agent authentication.

All end-points interact with the server over HTTP and go through the configured proxy (e.g., HA/F5 proxy).

The front-end proxy can have SSL configured, in which case the agent would access these end-points over HTTPS 4 (by default all these end-points have keep-alive HTTP connection header set.

The agent server adds various custom headers and a session cookie to all these end points (except close).

Apart from the standard HTTP response code, these end-points also contain an error code header to give more insight to the agent and take corrective action if possible.

Irrespective of backend service communication channel the agent—server communication is always HTTP.

All request and response message body between agent and server are compressed and sent (this would be on top of the original message compression, if there is one).

Once the Agent instance is authenticated and registered, the agent instance only sends following agent details with each request: Session Cookie—JSESSIONID; Message ID—Only for Send request. From the session cookie, the tunnel server retrieves the remaining information for the agent, such as the agent name and instance name. The agent session does not hold any other information and does not get invalidated unless one of the following things happen: the agent instance stops sending receive or send requests (no heart beats for a configured idle threshold time—this acts like session timeout); the agent instance sends a Close request.

Each application or service which is leveraging the tunnel service for on premise integration would have a dedicated port assigned on the tunnel server, but if there are multiple applications talking to same backend service, an instance can share the port. The assignment of a port is anticipated to be static in order to make it easy for applications and services to configure message forwarding, although this is not required. The tunnel port would be non-standard (say >50000). The tunnel port information is configured as part of agent configuration, which is most likely to reside in MTS. The tunnel server would start accepting message requests on the tunnel port only after the agent instance establishes the session with the tunnel server. The tunnel port would be configured as part of the source application subscription configuration inside MTS.

The communication between the Tunnel Server and applications and services can be HTTP, FTP, or any other supported protocol. Which protocol to use is part of the source application subscription configuration inside MTS. The communication protocol is the same as if the corresponding application or service would have made the back-end call directly. This communication may not be authenticated. The tunnel port would only be opened for active agents, and opening of the port would be done as part of first tunnel agent instance registration (OPEN Request). When there are no more tunnel agent instances registered and active with the tunnel server, this port would be closed, and accessing this port would result in a server-not-reachable type of error. Any errors resulting from accessing the back end service would be forwarded, as it is to the calling application/service. If any error occurs at the tunnel server or agent end, this would be notified using an HTTP response code. Additionally, the tunnel server would send an error code header to indicate the exact error in the system. When there are multiple tunnel servers, then this communication would be through load balancer.

Figure 9:
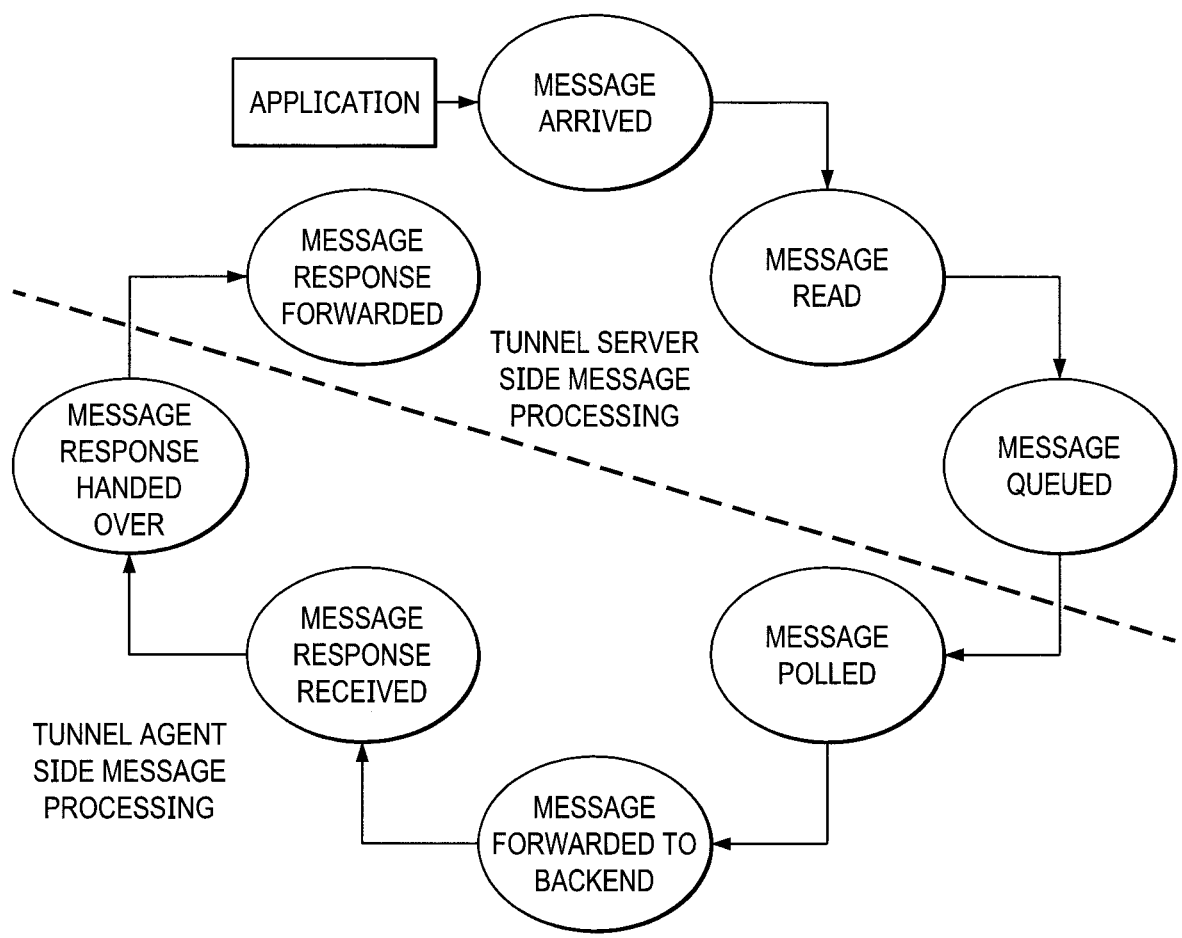
FIG. 9 depicts a diagrammatic representation of a flow of messages involving a tunnel server and tunnel agent according to some embodiments.

Every message tunneled through Tunnel Server goes through the pre-defined set of steps to execute and get the response from the back end service. At a high level, the following steps are involved in this process. This message flow is illustrated in the diagram of FIG. 9.

1. Application pushes the message on the tunnel port
2. Tunnel Server
   a. Reads the message
   b. Queue the Message in respective Agent Instance Message Queue
   c. Wait for next polling request from the agent
   d. On receiving the polling request
      i. Find the oldest non-processed message in the message queue
      ii. Create the wrapper response object
      iii. Write the serialized message as response body
      iv. Compress the response body
      v. Return the response
3. Agent
   a. Receives the responses for polling request
   b. Open the response and fetch the message
   c. Handover the message to the forward command/processor
   d. Forward command
      i. Send the message as is to the backend service
      ii. Wait for the response
      iii. On Response hand over the message response to send command e. Send command
      iv. Creates the wrapper request object
      v. Writes the serialized message response to request body
      vi. Compress the request message body iv. Sends the request to the server
4. On Tunnel Server
   a. Receive the send request
   b. Open the send request and fetch the message response
   c. Decompress the message body
   d. Retrieve the waiting request socket channel
   e. Write on the socket channel and close the connection
   f. Cleanup the message object
   g. Send success response back to the agent Even though it is expected that the messages would be picked up by the agent as soon as arrive, there are instances when the message might have to wait for next receive request. Consequently, the tunnel server's agent instance sub-system may maintain the FIFO message queue per agent instance. Apart from this queuing, there is no other message queuing happens at server or agent side.

When there is more than one agent instance registered for the backend-service, then the selection of an agent instance message queue follows following logic: check which agents are active (pinged within idle threshold time); check which ones have less messages to process; In case of a try-backer, the instance which is most recently active is picked up.

Figure 10:
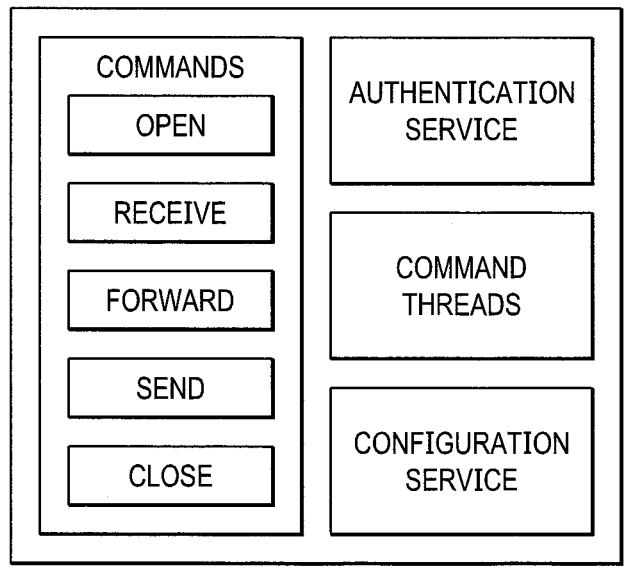
FIG. 10 depicts a diagrammatic representation of a tunnel agent architecture according to some embodiments.

FIG. 10 illustrates an exemplary architecture of the agent. As shown in the figure, the agent has the following main sub-systems.

End-Point Commands—this component is in direct co-relation to the tunnel server end-points, so there is one-to-one mapping. Additionally, the agent has forward commands which take care of forwarding the message to the back end system. Each command (e.g. the open command) is responsible for performing dedicated tasks. The commands and summaries of their responsibilities are listed below.

Open—This command takes care of authenticating the agent and requesting the server to open up the tunnel port. It also receives the backend configuration from the server and applies it to the agent instance.

Receive—This command takes care of polling for the messages. Once a message is received, it hands it over to the forward command. In case there is no message to return (204 response), the receive command ignores the message.

Forward—This command forwards the message to the backend service and, once a message response is received, it forwards the response to the send command. The major difference between this command and other commands is that it decides on a message handler based on the connection type configured as part of the agent configuration.

Send—This command receives the message response from the forward command, and then serializes the message into an HTTP request and sends it over to the tunnel server along with message and standard headers. This command also sends the processing times for the message. This information includes: time taken to forward the message; time taken by the backend service; time taken to send the message; and time from response received to send request initiated.

Close—This command is responsible for closing the tunnel. Once the tunnel is closed on the tunnel server, this stops the receive message polling command.

As part of command execution (mainly applicable to open, receive and send commands), if there is any error reported from the server, it is analyzed, and if the error is related to communication failure or session timeout (e.g. if server restarted), the agent instance resets itself and tries to execute an open command to re-establish the session. Both send and forward commands generate logs in the server send logging context. This helps in co-relating the logs across server and agent. While message processing occurs if there is any error, this error would be reported back to the server, so that server can report "unexpected error" back to the server. Please note this error forwarding is different than the one coming back from the back end server, which would be forward back to the calling application/service as it is.

Each command performs the message processing job in a new thread. This is intended to use thread polling to optimize performance. Depending on the nature of the command, there can be multiple long running threads created for the command (e.g., message retrieve/receive). Apart from the Command Threads, the underling network library (e.g., Netty) used for networking performs network calls using Java NIO in asynchronous way. This design has been put in place in order to avoid any synchronization issues across command threads.

Before establishing the session with the tunneling service, the agent authenticates itself with the OAuth service and gets the JWT token. With this JWT token, the agent performs the open call to the tunnel server.

There are several options for integrating the tunnel agent with the OAuth service. In one option, the customer would get the client Id and secrete for the agent. It may or may not be necessary to have separate client id and secrete per end service. It may be possible to have the same client id and secrete be shared among all the end services configured on the agent installation. In another option, a dedicated subscription user and role would be used. Here, the agent would be configured to get the JWT token like a normal subscription user. The subscription user can be for the source application or tunneling service.

The externalizable configuration capabilities of the agent can be leveraged, where the customer stores the client id and secrete in a secure location on the server and provides the file path as part of an environment variable or Java VM option.

The communication protocol used to forward and receive a response from backend service would be configured in the agent configuration as part of a subscription. To start with, the agent supports HTTP based back end services. However, the core design of the agent enables support for additional protocols with limited work.

It should be noted that the backend service responses would not be cached by agent or server, even though they have caching headers sets. The agent would not do any separate authentication with backend service. If there are any secure service end points that are accessed over Tunnel, it is the source application's responsibility to provide enough metadata in the message. The agent would not make any retries for a failed message request.

During agent process start, the umbrella process creates a separate thread and thread execution context (aka agent instance context). All command & command thread execution happens in this context to provide agent instance isolation. The agent configuration can also be scoped to the agent instance, which can be achieved by having any configuration parameter name appended with the agent name. One of the benefits of agent instance isolation is that the agent instance can selectively started and stopped, and control configuration can be controlled. Agent remote management can also be enabled. One of the ways this can be done is to expose JMX end-points. Another option would be to have an outbound command which would get the pending command from the tunnel server for any management task.

Those skilled in the relevant art can appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art can appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system for communications between publicly accessible and publicly non-accessible servers and a remote device, comprising:

a processor; and memory storing instructions that, when executed by the processor, causes the system to perform a set of operations for communications between servers and a remote device, the set of operations comprising:

receiving, at a proxy service for access to backend servers, a request from a remote device to access backend servers, the device physically outside the premises at which the backend servers reside;

determining, by the proxy service coupled to a management service, the management service to manage client access requests on the device, a customer and a connection associated with the request, the proxy service communicating with the management service to identify, based on the customer and the connection, a publicly accessible backend server to which to send the request or a publicly non-accessible backend server to which to send the request;

when the backend server is publicly accessible, forwarding the request to the publicly accessible backend server, executing the request and returning results of the request to the remote device;

when the backend server is publicly non-accessible, executing:

determining, by the proxy service, an appropriate tunnel server and tunnel agent that implement a tunneling communication channel associated with the backend server;

forwarding the request to the tunnel service determined by the proxy service, the tunnel service enabling secure access to the publicly non-accessible backend server;

storing the request;

retrieving the stored request by a tunnel agent by way of a Hypertext Transfer Protocol (HTTP) request to the tunnel server, the tunnel agent servicing the publicly non-accessible backend server;

forwarding the request to the publicly non-accessible backend server;

executing the request and returning results of the request to the tunnel agent, the tunnel agent returning results to the tunnel service, the tunnel service returning results to the proxy service, the proxy service returning the results to the remote device.

2. The system of claim 1, wherein the proxy service, management service, and tunnel service are co-located on a cloud-based platform that receives client requests from the remote device and the tunnel agent is co-located with the publicly non-accessible backend server on an on-premise enterprise platform.

3. The system of claim 2, wherein the publicly non-accessible backend server is behind a corresponding demilitarized zone accessible by an on-premises intranet but not directly accessible by the remote device, whereby the tunnel agent coupled to the publicly non-accessible backend server indirectly provides communications access via the HTTP request to the tunnel service on the cloud-based platform.

4. The system of claim 1, wherein a client application executing on the remote device issues the request received by the proxy service executing on a cloud-based platform.

5. The system of claim 1, wherein the request is a message and the tunnel agent is deployed in a customer data center, the tunnel agent reading the tunneled message via the HTTP request, the tunnel service executing in a cloud-based platform and exposing a public facing HTTP servlet end-point used by the tunnel agent to create tunnels, read tunneled messages, and write tunneled responses.

6. The system of claim 1, wherein the tunnel service is a plurality of tunnel services and the proxy service initializes a tunnel service store to store the request and route the request to publicly non-accessible backend server via one of the tunnel services.

7. The system of claim 1, wherein the HTTP request comprises authentication information from the device request to authenticate on the backend server.

8. A method for communications between publicly accessible and publicly non-accessible servers and a remote device, comprising:
  receiving, at a proxy service for access to backend servers, a request from a remote device to access backend servers, the device physically outside the premises at which the backend servers reside;
  determining, by the proxy service coupled to a management service, the management service to manage client access requests on the device, a customer and a connection associated with the request, the proxy service communicating with the management service to identify, based on the customer and the connection, a publicly accessible backend server to which to send the request or a publicly non-accessible backend server to which to send the request;
  when the backend server is publicly accessible, forwarding the request to the publicly accessible backend server, executing the request and returning results of the request to the remote device;
  when the backend server is publicly non-accessible, executing:
    determining, by the proxy service, an appropriate tunnel server and tunnel agent that implement a tunneling communication channel associated with the backend server;
    forwarding the request to the tunnel service determined by the proxy service, the tunnel service enabling secure access to the publicly non-accessible backend server;
    storing the request;
    retrieving the stored request by a tunnel agent by way of a Hypertext Transfer Protocol (HTTP) request to the tunnel server, the tunnel agent servicing the publicly non-accessible backend server;
    forwarding the request to the publicly non-accessible backend server;
    executing the request and returning results of the request to the tunnel agent, the tunnel agent returning results to the tunnel service, the tunnel service returning results to the proxy service, the proxy service returning the results to the remote device.

9. The method of claim 8, wherein the proxy service, management service, and tunnel service are co-located on a cloud-based platform that receives client requests from the remote device and the tunnel agent is co-located with the non-publicly accessible backend server on an on-premise enterprise platform.

10. The method of claim 9, wherein the publicly non-accessible backend server is behind a corresponding demilitarized zone accessible by an on-premises intranet but not directly accessible by the remote device, whereby the tunnel agent coupled to the publicly non-accessible backend server indirectly provides communications access via the HTTP request to the tunnel service on the cloud-based platform.

11. The method of claim 8, wherein a client application executing on the remote device issues the request received by the proxy service executing on a cloud-based platform.

12. The method of claim 8, wherein the request is a message and the tunnel agent is deployed in a customer data center, the tunnel agent reading the tunneled message via the HTTP request, the tunnel service executing in a cloud-based platform and exposing a public facing HTTP servlet end-point used by the tunnel agent to create tunnels, read tunneled messages, and write tunneled responses.

13. The method of claim 8, wherein the tunnel service is a plurality of tunnel services and the proxy service initializes a tunnel service store to store the request and route the request to publicly non-accessible backend server via one of the tunnel services.

14. The method of claim 8, wherein the HTTP request comprises authentication information from the device request to authenticate on the backend server.

15. A computer product comprising a non-transitory computer-readable medium storing instructions that, when executed, perform communications between publicly accessible and publicly non-accessible servers and a remote device, the instructions comprising:
  receiving, at a proxy service for access to backend servers, a request from a remote device to access backend servers, the device physically outside the premises at which the backend servers reside;
  determining, by the proxy service coupled to a management service, the management service to manage client access requests on the device, a customer and a connection associated with the request, the proxy service communicating with the management service to identify, based on the customer and the connection, a publicly accessible backend server to which to send the request or a publicly non-accessible backend server to which to send the request;
  when the backend server is publicly accessible, forwarding the request to the publicly accessible backend server, executing the request and returning results of the request to the remote device;
  when the backend server is publicly non-accessible, executing:
    determining, by the proxy service, an appropriate tunnel server and tunnel agent that implement a tunneling communication channel associated with the backend server;

forwarding the request to the tunnel service determined by the proxy service, the tunnel service enabling secure access to the publicly non-accessible backend server;

storing the request;

retrieving the stored request by a tunnel agent byway of a Hypertext Transfer Protocol (HTTP) request to the tunnel server, the tunnel agent servicing the publicly non-accessible backend server;

forwarding the request to the publicly non-accessible backend server;

executing the request and returning results of the request to the tunnel agent, the tunnel agent returning results to the tunnel service, the tunnel service returning results to the proxy service, the proxy service returning the results to the remote device.

16. The computer product of claim 15, wherein the proxy service, management service, and tunnel service are co-located on a cloud-based platform that receives client requests from the remote device and the tunnel agent is co-located with the publicly non-accessible backend server on an on-premise enterprise platform.

17. The computer product of claim 16, wherein the publicly non-accessible backend server is behind a corresponding demilitarized zone accessible by an on-premises intranet but not directly accessible by the remote device, whereby the tunnel agent coupled to the publicly non-accessible backend server indirectly provides communications access via the HTTP request to the tunnel service on the cloud-based platform.

18. The computer product of claim 15, wherein a client application executing on the remote device issues the request received by the proxy service executing on a cloud-based platform.

19. The computer product of claim 15 wherein the request is a message and the tunnel agent is deployed in a customer data center, the tunnel agent reading the tunneled message via the HTTP request, the tunnel service executing in a cloud-based platform and exposing a public facing HTTP servlet end-point used by the tunnel agent to create tunnels, read tunneled messages, and write tunneled responses.

20. The computer product of claim 15, wherein the tunnel service is a plurality of tunnel services and the proxy service initializes a tunnel service store to store the request and route the request to publicly non-accessible backend server via one of the tunnel services.

* * * * *